(12) United States Patent
Cahill

(10) Patent No.: US 9,216,720 B2
(45) Date of Patent: Dec. 22, 2015

(54) DIFFERENTIAL EMERGENCY/PARK ELECTRIC BRAKE SYSTEM

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 597 days.

(21) Appl. No.: 12/433,050

(22) Filed: Apr. 30, 2009

(65) Prior Publication Data

US 2010/0276988 A1  Nov. 4, 2010

(51) Int. Cl.
  B64C 25/00 (2006.01)
  B60T 8/17 (2006.01)
  B60T 8/88 (2006.01)
  B64C 25/48 (2006.01)

(52) U.S. Cl.
  CPC ........... B60T 8/1703 (2013.01); B60T 8/885 (2013.01); B64C 25/48 (2013.01); *B60T 2270/402* (2013.01)

(58) Field of Classification Search
  CPC .. B64C 25/44; B64C 25/48; Y10T 74/20244; B62D 11/08; G05G 9/047; G05G 2009/04714; G05G 2009/0474; G05G 2009/04748; G05G 2009/04751
  USPC ....... 244/50, 110 A, 111, 228, 230, 234, 236; 74/471 XY, 485; 303/9.61; 180/315
  See application file for complete search history.

(56) References Cited

U.S. PATENT DOCUMENTS

| | | | | |
|---|---|---|---|---|
| 1,895,478 A | * | 1/1933 | McCune | 303/9.61 |
| 2,007,500 A | * | 7/1935 | McCauley | 303/9.61 |
| 2,279,074 A | * | 4/1942 | Stearman | 244/50 |
| 2,470,968 A | * | 5/1949 | Aske | 338/98 |
| 2,503,755 A | * | 4/1950 | Martin et al. | 244/50 |
| 2,616,658 A | * | 11/1952 | Dombeck | 137/625.5 |
| 2,621,002 A | * | 12/1952 | Pittman | 244/50 |
| 2,724,980 A | * | 11/1955 | Russell | 74/471 R |
| 2,794,609 A | * | 6/1957 | Perry | 244/111 |
| 2,911,168 A | * | 11/1959 | Moreland | 244/50 |
| 4,008,868 A | * | 2/1977 | Berg | 244/111 |
| 4,138,905 A | * | 2/1979 | Konishi | 74/577 R |
| 4,221,350 A | * | 9/1980 | Moser et al. | 244/50 |
| 6,671,588 B2 | * | 12/2003 | Otake et al. | 701/3 |

FOREIGN PATENT DOCUMENTS

GB  365455 A  *  1/1932  .............. B64C 25/48

OTHER PUBLICATIONS

GB; Search Report dated Apr. 9, 2010 in Application No. GB0921978.3.

* cited by examiner

*Primary Examiner* — Bradley King
*Assistant Examiner* — Stephen Bowes
(74) *Attorney, Agent, or Firm* — Snell & Wilmer, L.L.P.

(57) ABSTRACT

A system, apparatus and method provide emergency differential braking for effecting braked steering of an aircraft. A brake input device is provided that not only allows for emergency and parking brake functions, but also enables differential braking. The brake input device (e.g., a parking and/or emergency brake lever, pedal, handle, etc.) can be used in a brake system including a brake system control unit (BSCU), one or more electro-mechanical actuator controllers (EMACs) and a brake assembly including one or more electrical actuators. Each EMAC is electrically coupled to one or more of the actuators so as to provide electrical power for driving the actuators. Each EMAC is also communicatively coupled to the BSCU so as to receive braking data therefrom. In an emergency, the input device sends braking signals directly to the brake actuators.

6 Claims, 14 Drawing Sheets

DIFFERENTIAL EMERGENCY/PARK ELECTRIC BRAKE SYSTEM

FIELD OF THE INVENTION

The present invention relates generally to brakes and, more particularly, to brake controls for providing parking and emergency braking functions in an aircraft.

BACKGROUND

Aircraft, much like other vehicles, incorporate an emergency braking system that activates the brakes for long term parking, and for emergency stopping when the principal brake system fails. Such emergency brake systems may be electrically or hydraulically operated, and are well known to those having ordinary skill in the art.

In electrically operated emergency brake systems, an emergency brake command signal (in the form of an analog or digital signal) is generated by an emergency brake lever or handle, and this signal is provided to a brake system control unit (BSCU). The BSCU, based on the signal, commands an electro-mechanical actuator controller (EMAC) to power an actuator. The EMAC, in response to the command from the BSCU, provides electrical power to an actuator of a brake assembly so as to effect a braking force.

Additionally, electrically operated brake systems also include a separate emergency brake control box. The emergency brake control box is configured to control the brake actuators during failure of the primary brake system (e.g., during failure of the BSCU). Typically, such systems are designed to activate all brakes the same amount so as to bring the aircraft to a stop.

SUMMARY OF INVENTION

A brake input device for an emergency brake system is provided that not only allows for emergency and parking brake functions, but also allows differential braking to effect braked steering of an aircraft. This allows the pilot to not only stop the plane in an emergency, but also to steer the plane with the brakes during an emergency stop. More specifically, the brake input device (e.g., a parking and/or emergency brake lever, pedal, handle, etc.) can be used in a brake system including a brake system control unit (BSCU), one or more electro-mechanical actuator controllers (EMACs) and a brake assembly including one or more electrical actuators. Each EMAC is electrically coupled to one or more of the actuators so as to provide electrical power for driving the actuators. Each EMAC is also communicatively coupled to the BSCU so as to receive braking data therefrom.

Each EMAC may include a switch or the like for selecting a signal to be provided to the EMAC's servo compensation network and driver circuits. The switch is controlled via a braking mode signal (normal or park/emergency) generated based on the brake input device. The output of the switch is coupled to an input of the EMAC's servo compensation network and actuator driver circuits so as to select the signal used by the servo compensation network and driver circuits for controlling the actuators.

For normal brake operation, the BSCU generates a brake force signal corresponding to a desired brake force, and provides the brake force signal to each EMAC. Each EMAC's processor, based on the brake force signal from the BSCU, generates a brake control signal for the servo compensation network and actuator driver. During normal brake mode, the switch selects the signal generated by the EMAC's processor and provides this signal to the servo compensation network and driver circuits. Thus, overall brake control during normal braking is provided via the BSCU and the EMAC's processors.

For parking and/or emergency braking/steering operation, the brake mode signal provided to each EMAC is indicative of park/emergency/steering mode. Based on this mode, the switch routes the brake command signal(s) as generated by the brake input device directly to the EMAC's servo compensation network and actuator drivers. The servo compensation network and drivers then control the actuators so as to effect a braking force. Thus, during parking and emergency braking/steering, both the BSCU and the EMAC's processor are bypassed, and brake control is directly provided by the brake input device (e.g., from the brake handle). Such architecture is advantageous as it eliminates the need for a separate (or isolated) emergency control box to command the EMACs in the event of failure of the primary braking system.

According to one aspect of the invention, an emergency brake input device for providing emergency braking signals to at least two brake actuators associated with respective left hand and right hand brake assemblies of a vehicle comprises an input member movable in a first direction corresponding to a braking magnitude and movable in a second direction corresponding to a relative distribution of the braking magnitude between first and second brake signals for the control of the at least two brake actuators. The first and second brake signals can be modulated by a pilot during emergency braking so as to apply differential braking to separate wheels of an aircraft.

More particularly, the input member can be movable linearly between first and second positions corresponding to minimum and maximum braking magnitudes, with the position of the handle being indicative of a desired magnitude of braking. The input member can be rotatable about its central axis with an angular position of the input member being indicative of a desired distribution of the braking magnitude between the first and second signals. For example, the input member can include a handle that is both slideable linearly and rotatable. At least one sensor can be provided for sensing a position of the input member and generating the brake signals in response thereto. The input device can also include a parking brake lock for locking the input member in a parking brake position, which may correspond to a maximum magnitude of braking. A parking brake sensor for sensing when the input device is in a parking brake mode and for generating a signal in response thereto can also b provided.

In accordance with another aspect, an aircraft braking system comprises at least one brake assembly for braking a wheel of an aircraft, the braking assembly including at least one actuator for effecting a braking action in response to a braking signal provided thereto, and a brake input device as set forth above for providing the braking signal to the actuator.

In accordance with another aspect, an emergency brake system comprises at least two brake assemblies having actuators for braking respective wheels of an aircraft, and an emergency brake input device for providing emergency braking signals to each actuator. The input device has first and second input members for generating first and second brake signals for the control of the at least two brake assemblies, the input members each being movable between a first position corresponding to a minimum magnitude of braking and a second position corresponding to a maximum magnitude of braking. The first and second brake signals can be modulated by a pilot during emergency braking so as to apply differential braking to separate wheels of an aircraft.

More particularly, the first and second input members can be pedals. At least one sensor can be provided for sensing a position of an input member and generating a brake signal in response thereto. A parking brake lock can be provided for locking the input members of the input device in a parking brake position, which position may correspond to a maximum magnitude of braking. The parking brake lock can include a latch that maintains the first and second input members in the parking brake position. A parking brake sensor for sensing when the input device is in a parking brake mode and for generating a signal in response thereto can also be provided.

According to another aspect, a method of applying differential braking of wheels of an aircraft during emergency braking comprises generating a first brake signal indicative of a braking force to be applied to a first wheel by a first brake assembly, generating a second brake signal indicative of a braking force to be applied to a second wheel by a second brake assembly, and feeding the first and second signals to the first and second brake assemblies to effect braking of respective wheels in response to the respective first and second signals.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The principles of the invention will now be described with reference to the drawings. Because the invention was conceived and developed for use in an aircraft braking system, it will be herein described chiefly in this context. However, the principles of the invention in their broader aspects can be adapted braking systems in other types of vehicles. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

Figure 1:
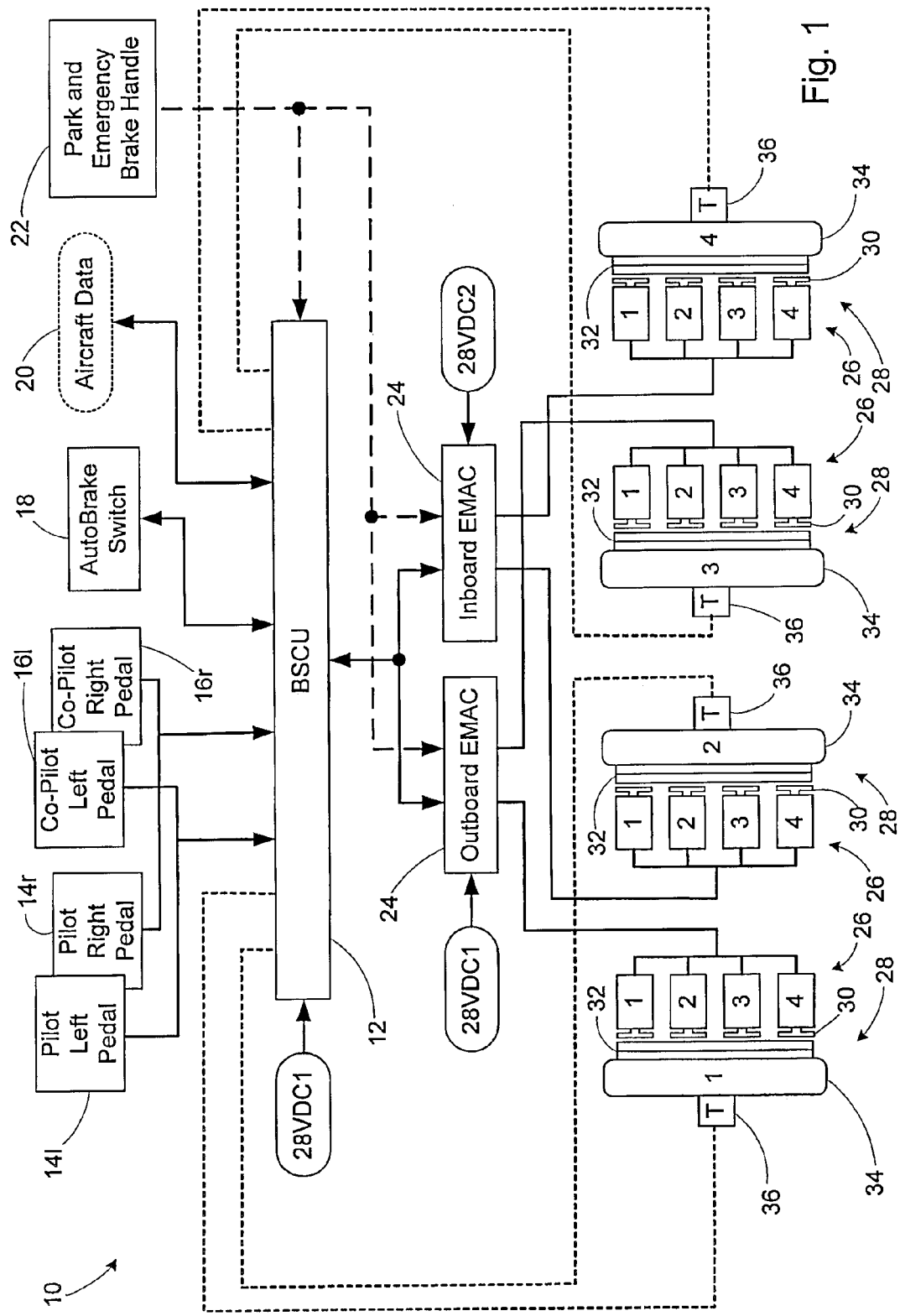
FIG. 1 is a simple schematic diagram illustrating an exemplary architecture for controlling an aircraft braking system in accordance with the present invention.

Referring initially to FIG. 1, there is shown an exemplary electrical brake system 10 having architecture in accordance with the present invention. The exemplary electrical brake system includes a brake system control unit (BSCU) 12 configured to carryout braking operations of the aircraft as is conventional. The BSCU 12 is configured to receive various operator inputs, such as left and right pilot brake pedal signals from left and right pilot brake pedals 14*l* and 14*r*, and left and right co-pilot brake pedal signals from left and right co-pilot brake pedals 16*l* and 16*r*. The brake pedal signals can be generated, for example, via LVDTs (linear variable differential transformers—not shown) operatively coupled to the respective pedals. As the pedals are depressed, each LVDT generates a voltage signal corresponding to the degree of pedal deflection, and this voltage signal can be provided to the BSCU 12 as is conventional. As will be appreciated, other known methods for generating the brake pedal signals may also be employed, including encoders, potentiometers, or the like.

The BSCU 12 may also receive other operator inputs, such as data from an autobrake switch 18 for configuring autobrake logic. The autobrake switch 18 may include several settings, such as an enable/disable input, an auto braking level input (e.g., low, medium, high) and a rejected take off (RTO) input (e.g., for enabling or disabling RTO functionality). The BSCU 12 may also receive other aircraft data 20, such as discrete data (e.g., sensor data such as weight-on-wheels, landing gear up/down, etc.), analog data (e.g., force data, temperature data, etc.), serial data, etc. as is conventional.

The BSCU 12 is communicatively coupled to one or more electro-mechanical actuator controllers (EMACs) 24, wherein the BSCU 12 provides a brake force signal to the respective EMACs during normal braking operations. Preferably, the coupling is via a serial communication link, although data also can be exchanged via discrete and/or analog connections. The BSCU 12 is configured to derive the brake force signal based on brake data generated by the pedals 14*l*, 14*r*, 16*l*, 16*r*, and/or autobrake and antiskid control.

A brake input device 22, preferably a combination parking brake/emergency brake device (e.g., a handle, lever, pedal, or the like), provides a brake command signal to each EMAC 24. The brake command signal can be generated using known techniques, such as an LVDT as described above with respect to the brake pedals 14*l*, 14*r*, 16*l*, 16*r*, or via an encoder or potentiometer configured to provide data corresponding deflection or rotation of the brake input device 22. As will be appreciated, other known methods of generating the brake command signal may also be employed. Preferably, the brake input device includes a mode selector to indicate when normal or parking/emergency braking is desired. For example, the brake input device 22 may include contacts that are open when the brake input device is in a first position (e.g., rotated to the left or pushed inward) and closed when the brake input device is in a second position (e.g., rotated to the right or pulled outward). Alternatively, the brake mode selector may be separate from the brake input device 22. The brake input device 22 can also provide separate braking signals for respective left and right side brakes as will be described in more detail below. Further details regarding various brake input devices are provided below with respect to FIGS. 4A through 9.

The EMACs 24 are electrically coupled to one or more actuators 26 of a brake assembly 28, wherein each brake assembly 28 includes the one or more actuators 26, corresponding rams 30 operatively coupled to each actuator 26, and a brake-disk stack 30 having a plurality of rotors coupled for rotation with a wheel 34 and stators rotationally fixed with respect to the wheel 34. Each actuator 26 and ram 30 are configured for forceful engagement with the brake-disk stack 30 so as to provide a brake force to a corresponding wheel 34. Wheel speed sensors 36 provide wheel speed data to the BSCU 12 for implementing anti-skid and autobrake functions as is conventional.

As noted above, each EMAC 24 receives the brake force signal from the BSCU 12. In addition to the brake force signal, each EMAC 24 is configured to receive the brake command signal from the brake input device 22, and the brake mode signal indicative of whether normal brake operation or park/emergency brake operation is desired. Based on the brake mode signal, each EMAC 24 selects a signal corresponding to the brake force signal provided by the BSCU 12 or the brake command signal provided by the brake input device 22 and, based on the signal, controls the actuators to effect a braking force. Further details regarding EMAC operation are discussed below with respect to FIGS. 2 and 3.

Figure 2:
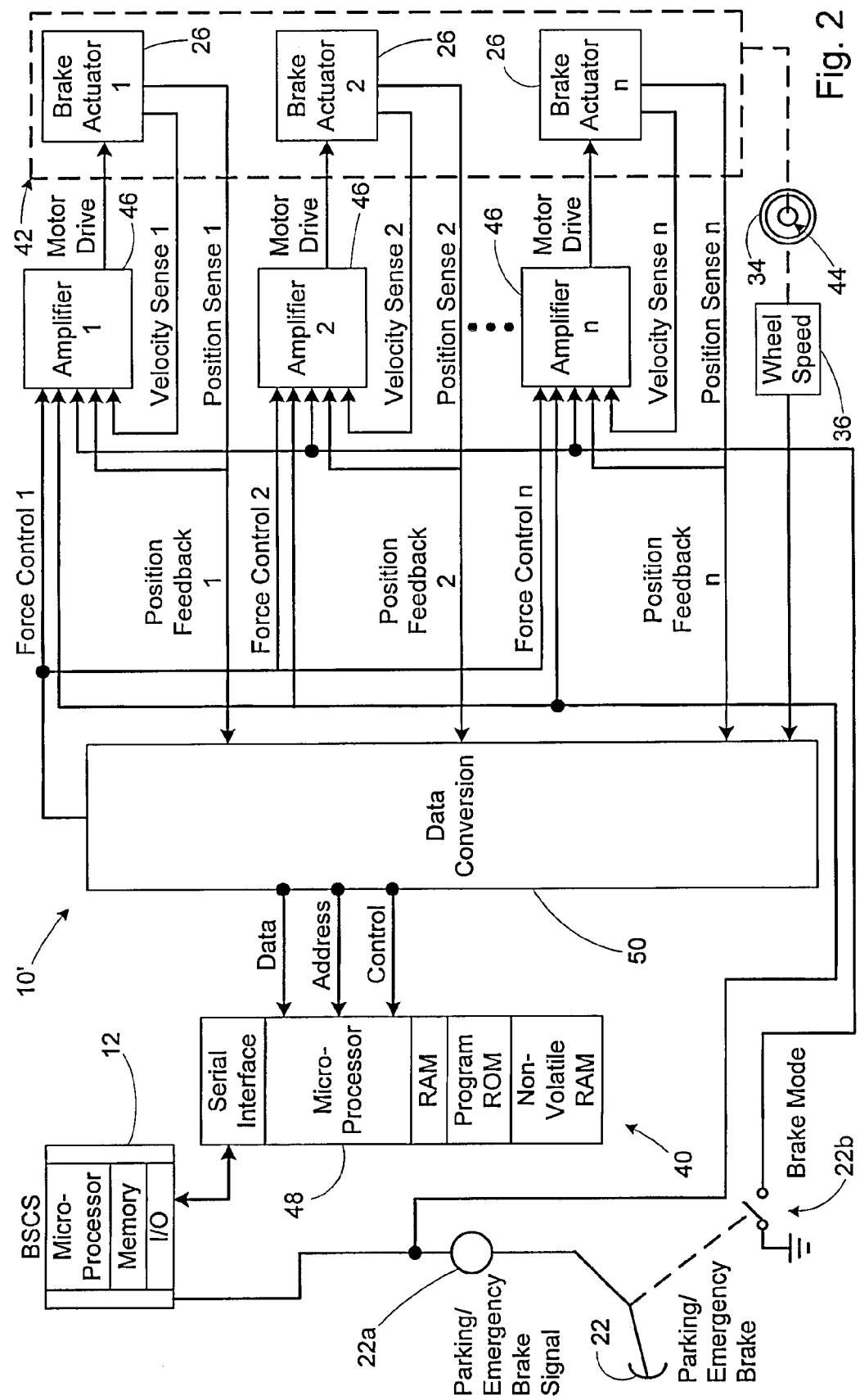
FIG. 2 is a diagrammatic illustration of an exemplary multi-actuator computer controlled brake actuation system.

FIG. 2 diagrammatically illustrates an exemplary multi-actuator computer controlled electrical brake actuation system 10' to which the principles of the invention may be applied. The major functions of the system 10' are performed by an EMAC controller 40 and a brake actuator assembly 42. The brake actuator assembly 42 may be mounted in a conventional manner on a wheel and brake assembly 44 to apply and release braking force on a rotatable wheel 34 of such wheel and brake assembly. Wheel speed data is provided to the controller 40 via a wheel speed sensor 36 coupled to each wheel 34.

In the illustrated exemplary system 10', the brake actuator assembly 42 includes at least one and preferably a plurality of actuators 26, such as electro-mechanical actuators (EMAs) 26. The EMAC controller 40 includes a corresponding number of independent servo amplifiers 46, a micro-processor 48 with associated peripherals, and a data input/output (I/O) circuitry 50. As depicted, plural (for example, four) independent, linear electro-mechanical servo loops operate in a position mode, i.e., the linear position of each actuator is a function of an analog input voltage (or digital equivalent for a digital signal processor) applied to a position command input.

As noted above, the brake input device 22, via signal generator 22a, generates the brake command signal, which is provided to each EMAC (e.g., to each amplifier 46 of the EMAC). Also provided to each amplifier is a brake mode input, which is generated via switch 22b. During normal braking operations, switch 22b is closed, and brake control is performed via the BSCU 12 and EMAC controller 40. However, during park/emergency braking operations, switch 22b is open, and each amplifier 46 uses the braking command as provided by the brake input device 22, thereby bypassing the BSCU 12 and EMAC controller 40. Thus, each amplifier can include a switching means for selecting between the data generated by the BSCU 12 and processor 48, or the actual data provide by the brake input device 22.

Figure 3:
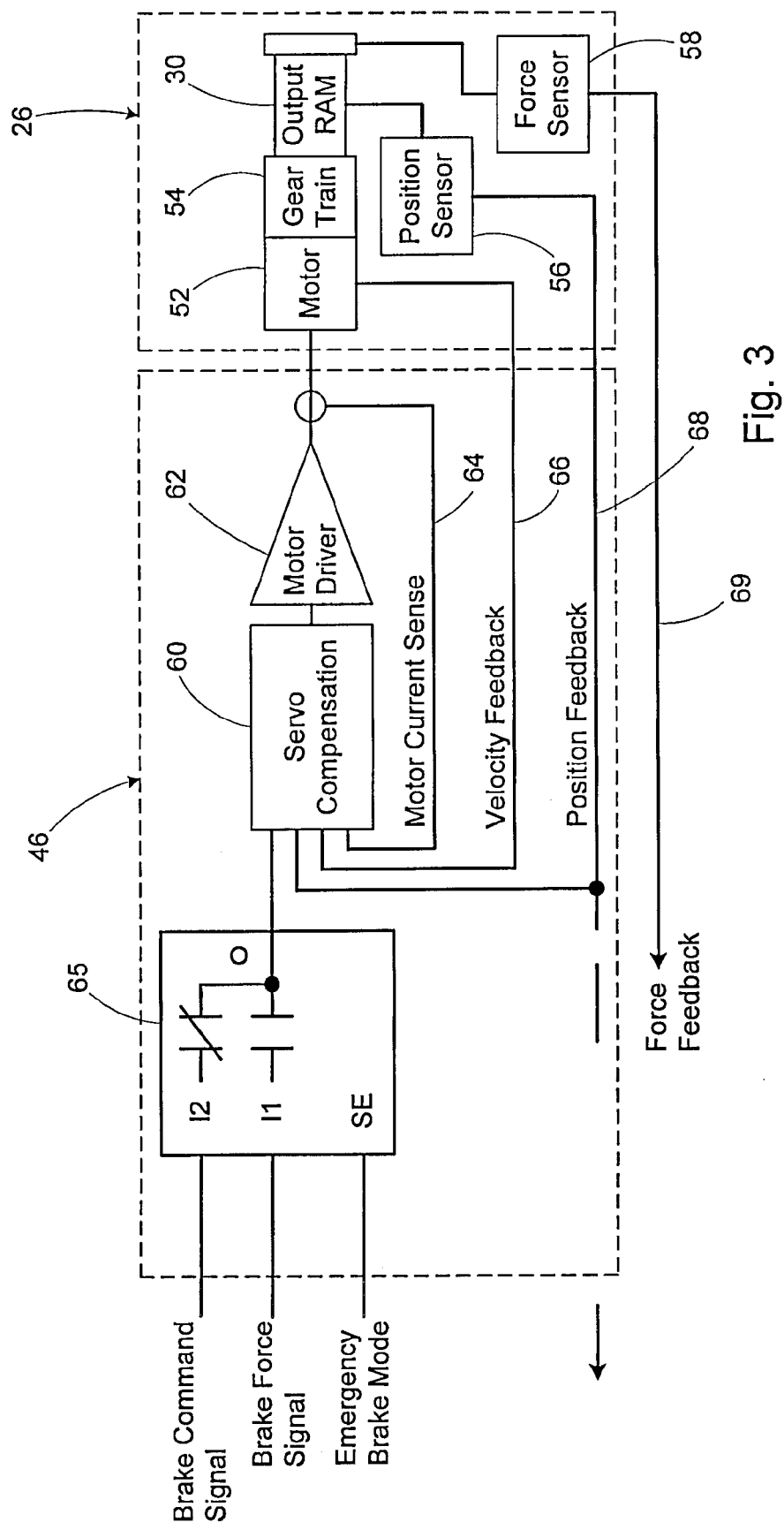
FIG. 3 is a diagrammatic illustration of a brake actuator and associated servo amplifier employed in the system of FIG. 2.

In FIG. 3, a representative electro-mechanical brake actuator 26 and associated servo amplifier 46 are illustrated in greater detail. The brake actuator 26 includes an electric servo motor 52, gear train 54, and a reciprocating output ram 30. The brake actuator has associated therewith an output ram position sensor 56 which provides for actuator position feedback as depicted, and a force sensor 58 that provides data indicative of a force applied by the brake actuator on the brake-disk stack. Although not shown, the brake actuator 26 also has associated therewith a motor tachometer to provide for velocity feedback.

The servo amplifier 46 includes servo loop compensation network and amplifiers 60, and a DC motor driver 62 with associated control logic and current control circuitry. More particularly, the servo amplifier 46 may include an inner motor current control servo loop 64, an intermediate motor velocity servo loop 66, and a ram position servo loop 68. Force feedback data 69 may be provided to the BSCU for control of actual applied force. Each loop may be compensated to obtain desired performance in terms of bandwidth, and to provide for uniform dynamic response of all brake actuators 26. In addition, the servo amplifier 46 includes means for controlling motor current and therefore the output force of the brake actuator in response to a force control input. The force control input may be an analog input signal that controls motor current level while the aforesaid position command input controls actuator displacement. As will be appreciated, the analog input signals may be replaced by digital input signals if a digital signal processor is used in the servo amplifier for actuator control.

A switch 65 provides an input to the servo loop compensation network 60. Preferably, switch 65 is an electronic or software switch. However, a mechanical switch may be employed depending on the configuration of the EMAC 24. The switch 65 includes a first input I1 configured to receive the brake control signal from the EMAC controller 40 (which effectively is derived from the pedals 14l, 14r, 16l, 16r and/or autobrake/antiskid logic from the BSCU 12), and a second input I2 configured to receive the brake command signal from the brake input device 22. A select input SE of switch 65 is coupled to the mode switch 22a, and an output of switch 65 is coupled to the servo loop compensation network as noted above. Based on the particular braking mode as indicated by the mode switch 22b, the switch 65 will provide either the brake control signal (from the EMAC controller 40) or the brake command signal (from the brake input device 22) to the servo loop compensation network 60. Although not shown, scaling logic may be included in the EMAC to properly scale the brake command signal for use with the EMAC circuitry. Further, while the switch is shown as part of the EMAC, it is possible for the switch to be separate from the EMAC 24.

During normal braking, the select input SE is true, and the switch 65 connects the first input I1 to the switch output, thereby coupling the brake control signal from the EMAC controller 40 to the servo loop compensation network 60 (and thus the motor driver 62). Accordingly, the displacement of each actuator 26 is controlled by the electronic controller 40 (FIG. 2) and the BSCU 12. The micro-processor 48 of the controller 40 provides brake control algorithm processing, temporary data storage in RAM, program memory storage, non-volatile data storage, and control of the servo amplifiers 46 via the input/output circuitry 50. The input/output circuitry 50 provides for digital-to-analog data conversion, generating the analog position commands and the analog motor current control commands to the four actuators, analog-to-digital data conversion to monitor the actuator position sense and motor current feedback signals, and signal discretes for auxiliary functions such as motor brake control. Although microprocessors are utilized in the illustrated preferred embodiment, processing could be done analog as opposed to digital, or intermixed with digital processing as may be desired.

During park/emergency braking operations, both the BSCU 12 and controller 40 are bypassed, and the displacement of each actuator 26 is directly controlled by brake input device 22. More specifically, when the brake mode corresponds to park/emergency braking, the select input SE is false, and the switch 65 connects the second input I2 to the switch output, thereby directly coupling the brake command signal from the brake input device 22 to the servo loop compensation network 60. Thus, in the event of primary brake system failure, park/emergency braking can be provided via the each EMAC, without the need for an emergency control unit. As will be appreciated, the brake input device 22 can provide brake signals to respective left and right brake assemblies, for example, for implementing braked steering. Further details of the brake system are set forth in commonly-assigned U.S. patent application Ser. No. 12/429,303 filed on Apr. 24, 2009 titled "ELECTRIC BRAKE ARCHITECTURE WITH DISSIMILAR EMERGENCY BRAKING PATH," which is hereby incorporated by reference herein in its entirety.

Figure 4A:
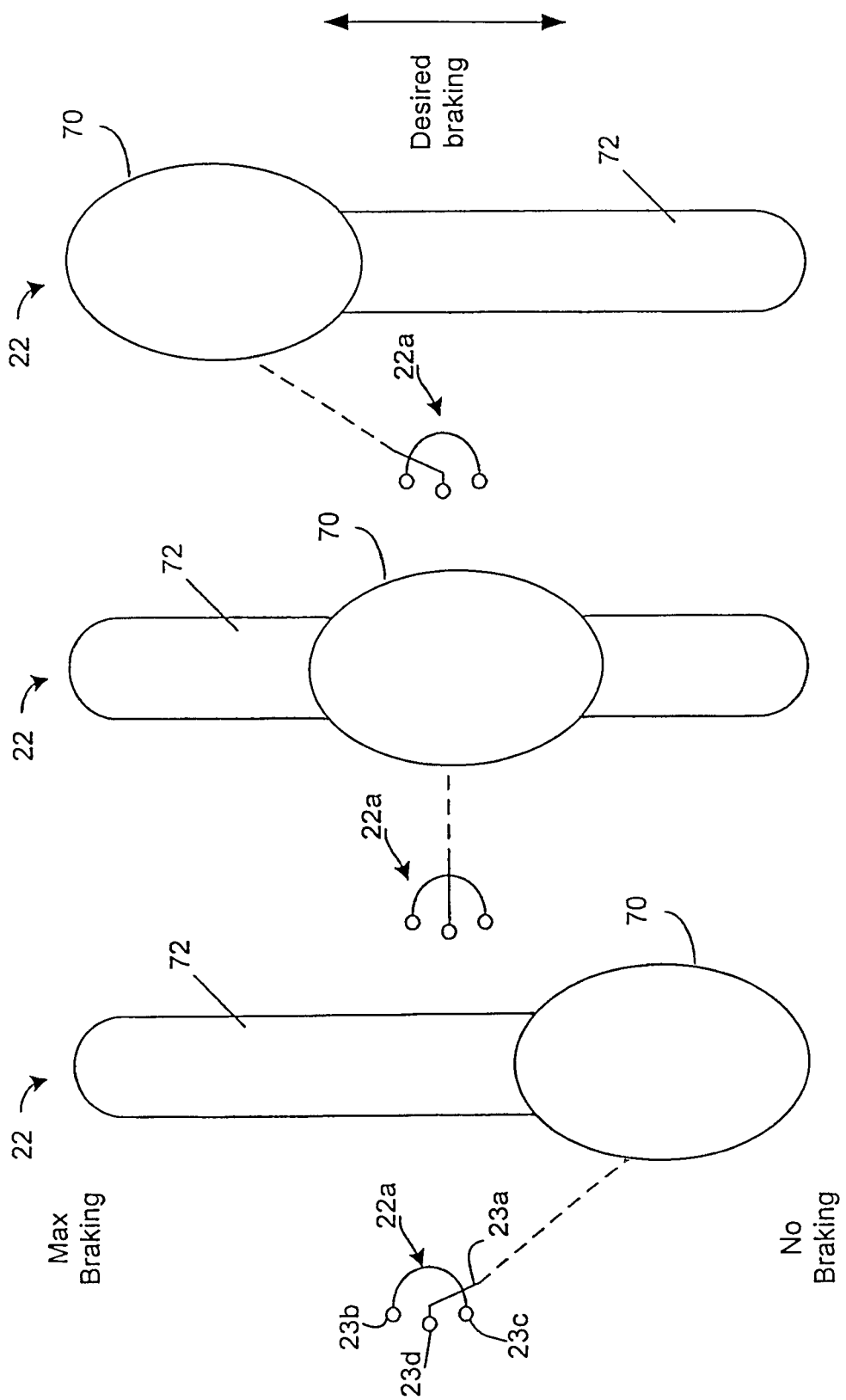
FIGS. 4A and 4B are schematic diagrams illustrating an exemplary brake input device in accordance with the invention.
Figure 4B:
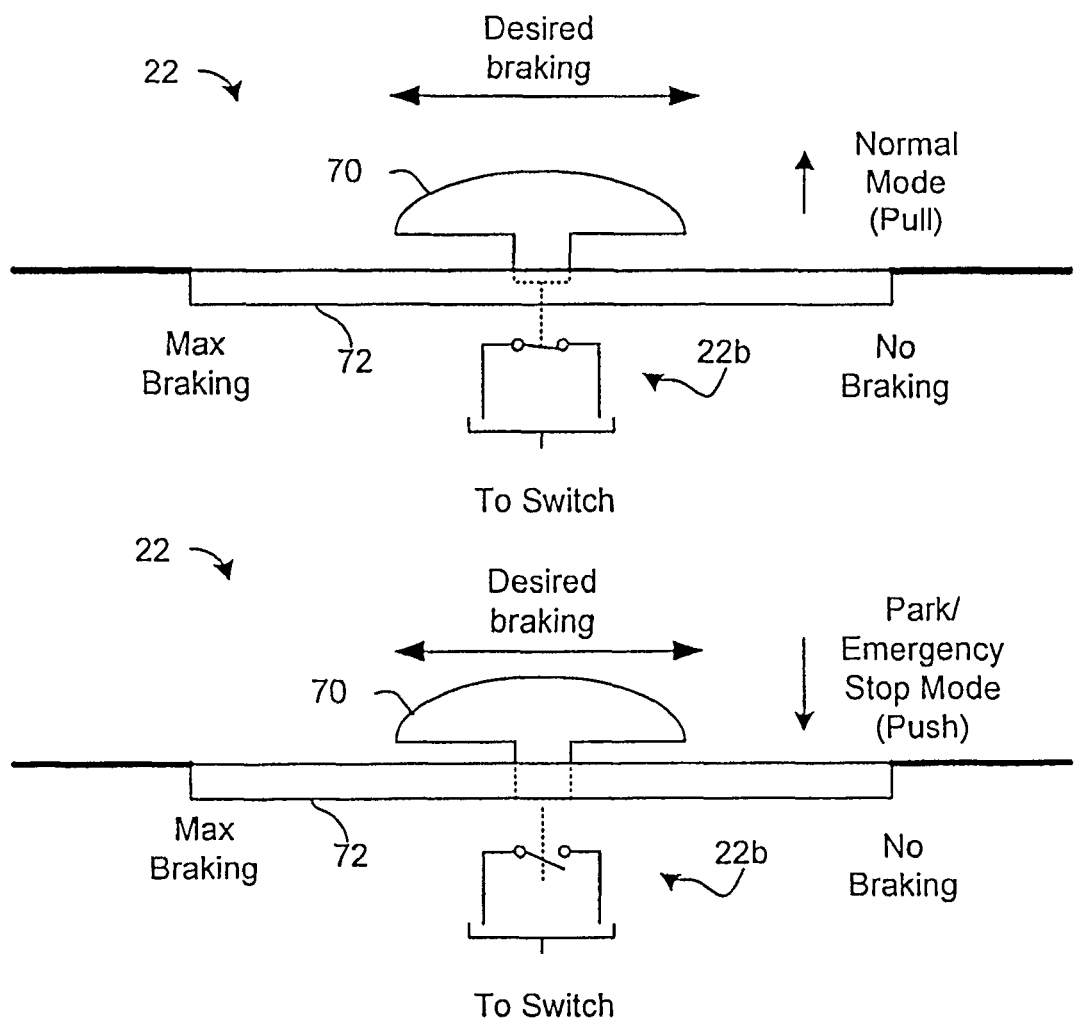

Referring now to FIGS. 4A and 4B, a brake input device 22 is schematically shown from a top view (FIG. 4A) and a side view (FIG. 4B). The exemplary brake input device 22 includes a handle 70 configured for movement along a channel or guide 72. Operatively coupled to the handle 70 is a signal generator 22a, such as a potentiometer 22a, wherein movement of the handle 70 along the channel 72 causes a corresponding deflection of a wiper arm 23a of the potentiometer. By applying a voltage across the outer terminals 23b and 23c of the potentiometer 22a, a brake command signal can be generated at the wiper arm terminal 23d that corresponds to the position of the handle within the channel (and thus the desired amount of braking).

It is noted that reference to a potentiometer is merely exemplary, and other devices, such as an LVDT, encoder, etc. may be used in place of the potentiometer to derive the brake command signal. Although not shown in FIG. 4A, the terminals of the potentiometer 22a are electrically coupled to the EMAC 24 so as to provide the brake command signal thereto.

With further reference to FIG. 4B, a simple side schematic view of the exemplary brake input device 22 is shown. The handle 70, in addition to being operatively coupled to the signal generator 22a, is also operatively coupled to switch 22b. Preferably, handle 70 is a maintained push-pull handle such that it can be maintained in an out position (pull) or an in position (push). When in the "out/pull" position, switch 22b is in an electrically closed state, and while in the "in/push" position, switch 22b is in an electrically open state. The "out/pull" position can correspond to normal braking mode (i.e., brake control via the BSCU 12), while the "in/push" position can correspond to park/emergency mode. Switch 22b is electrically coupled to switch 65 so as to provide an indication of the current braking mode (normal or park/emergency).

In another embodiment, the brake input device can comprise a rotatable handle (as opposed to a push/pull device). In this embodiment, rotation of the handle in one direction (e.g., left) may correspond to normal brake mode, and rotation of the handle in another direction (e.g., right) can correspond to park/emergency brake operation.

Accordingly, the brake input device 22 can provide both a park/emergency brake reference, and a mode indicator that can be used to configure the brake system's mode of operation. This is advantageous, as the pilot need only manipulate a single controller for park/emergency brake operation.

Figure 5B:
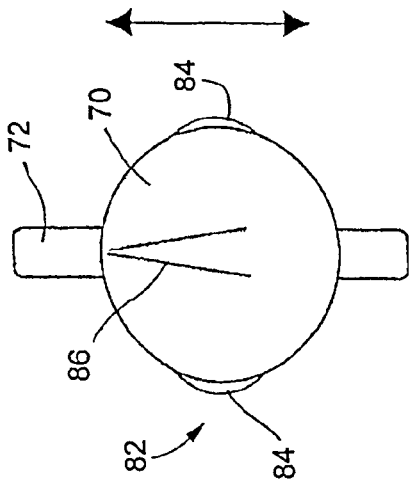
FIGS. 5A-5D are schematic diagrams illustrating another exemplary brake input device in accordance with the invention in various modes of operation.
Figure 5D:
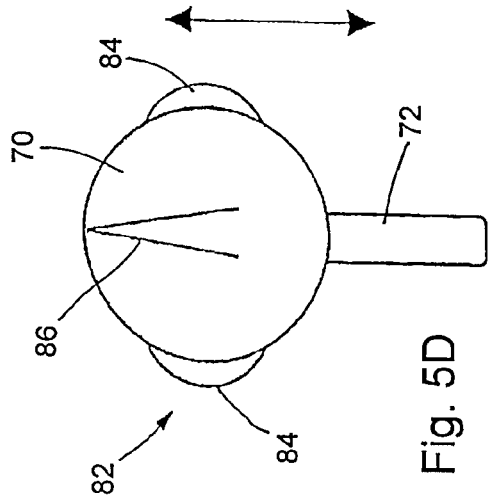
Figure 5A:
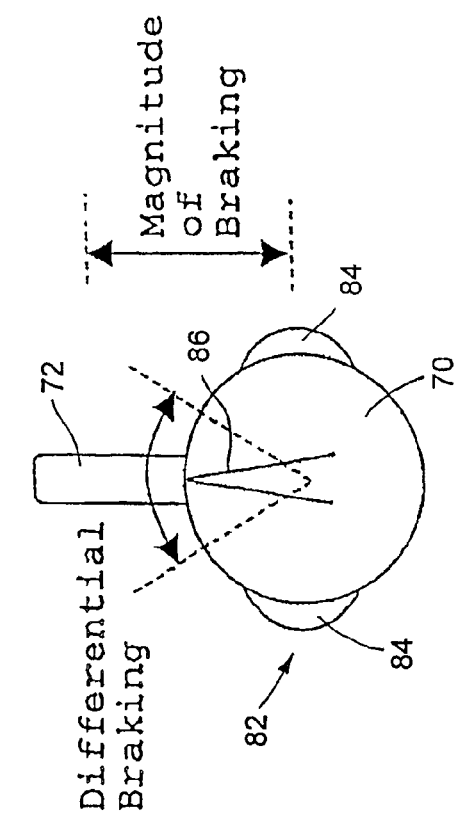
Figure 5C:
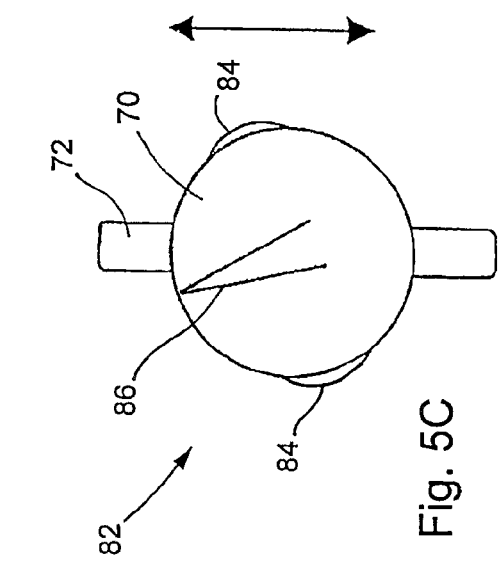
Figure 6:
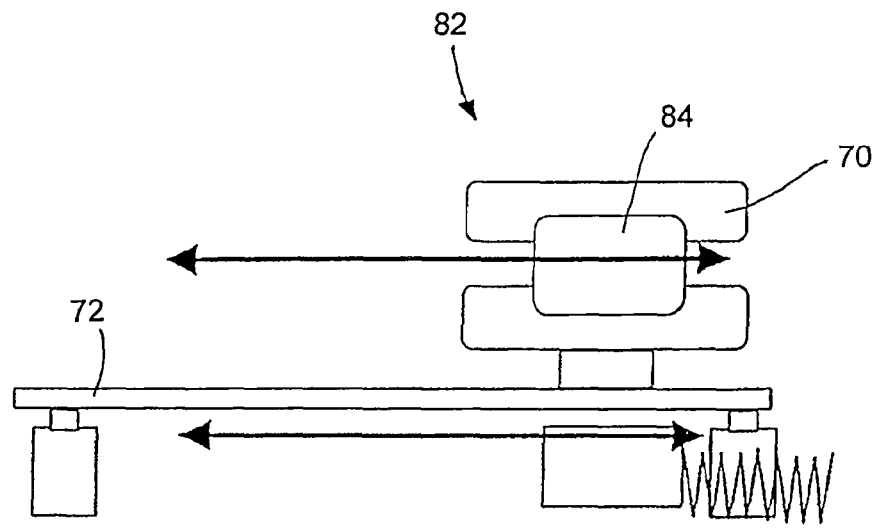
FIG. 6 is a schematic diagram illustrating a side view of the exemplary brake input device of FIGS. 5A-5D.

Turning to FIGS. 5A-5D and 6, and initially to FIGS. 5A and 6, a brake input device 82 is shown that provides functionality similar to the brake input device 22 described above, but also facilitates differential braking to effect braked steering during emergency braking. The brake input device 82 is similar to the device 22 in both form and function with the exception of the handle 70, which is rotatable about its central axis to control an amount of braking applied to separate brake assemblies, for example left and right brake assemblies.

Accordingly, brake input device 82 includes handle 70 mounted on guide 72 for both sliding and rotating movement, and a pair of side buttons 84 for permitting emergency braking and also for locking the handle 70 in the park position, as will be described in more detail below. Similar to input device 22 described above, sliding the handle 70 forward produces an increasing brake signal. In this embodiment, however, rotation of the handle 70 produces respective left and right brake signals that can be fed directly to each EMAC to effect differential braking. A directional indicator 86 indicates the direction in which the aircraft will be steered relative to the forward direction (e.g., with respect to the longitudinal axis of the guide 72).

More specifically, and with further reference to the remaining FIGS. 5B-5D, the input device 82 is shown in various positions corresponding to various braking actions. In FIG. 5A the handle 70 is locked in the aft position corresponding to no braking activity. The side buttons 84 are not depressed and serve to hold or otherwise lock the handle in the illustrated position to avoid inadvertent brake actuation. FIG. 6 illustrates a schematical side view of the brake input device 82 in the position of FIG. 5A In FIG. 5B, the side buttons 84 have been depressed and the handle 70 has been moved to a position corresponding to moderate emergency braking. The indicator 86 is pointing straight forward thus indicating that the brake input device 82 is providing identical (or nearly identical) first and second signals to the brake actuators for actuating respective left and right brake assemblies such that the aircraft brakes in a relatively straight line.

In FIG. 5C, the handle 70 has been rotated counterclockwise such that it is now pointing to the left of the longitudinal axis of the guide 72. This position corresponds to differential (steered) braking wherein the aircraft tends to rotate left during emergency braking. As will be appreciated, the brake input device 82 can be configured to generate respective output signals for the left and right brake assemblies in response to rotation of the handle 70. For example, when rotated to the left, the left hand brake assembly or assemblies would be activated to a greater extent than the right hand brake assembly or assemblies causing the aircraft to rotate towards the left. Conversely, when the handle is rotated to the right (not shown), the right side brake assembly or assemblies would be activated to a greater extent than the left side brake assembly or assemblies causing the aircraft to rotate towards the right.

In FIG. 5D, the handle 70 is in its forward-most position corresponding to full braking and/or parking brake mode. In this instance, the side buttons 84 have returned outward indicating that the handle 70 is locked in the parking brake position. Once in this position and with the side buttons 84 locked, the brake input device 82 generates a signal indicative of the parking brake being applied as described previously.

Accordingly, the brake input device 82 of FIGS. 5A-5D facilitates both differential emergency braking for steering the aircraft during an emergency stop, as well as a parking brake function. The exemplary device 82 is intuitive since braking action is applied by sliding the handle 70 forward (much like depressing a pedal), while differential braking is achieved by rotating the handle 70 in the direction the pilot desires to steer the plane. Of course, the handle 70 could be configured to be pulled rather than pushed to generate the braking signal. As will be appreciated, the brake input device 82 need not have a particular form or shape. For example, the handle 70 can be made to look like the wheels of an aircrafts, while the side buttons 84 can be made to look like wheel chocks. In the illustrated embodiment, the input device is biased towards the position shown in FIG. 5A (e.g., no braking and no differential braking).

Further, the side buttons 84 can be configured to work in a variety of ways. For example they may restrict initial movement of the handle 70 from the position of FIG. 5A until depressed. The side buttons may then remain in the depressed state as the handle is slid fore and aft by the pilot, only to return to the locked position upon return of the handle 70 to the position of FIG. 5A, or upon engagement of the parking brake (e.g., by pushing the handle 70 all the way forward). The side buttons 84 may then retain the handle 70 in the parking brake position.

Figure 7:
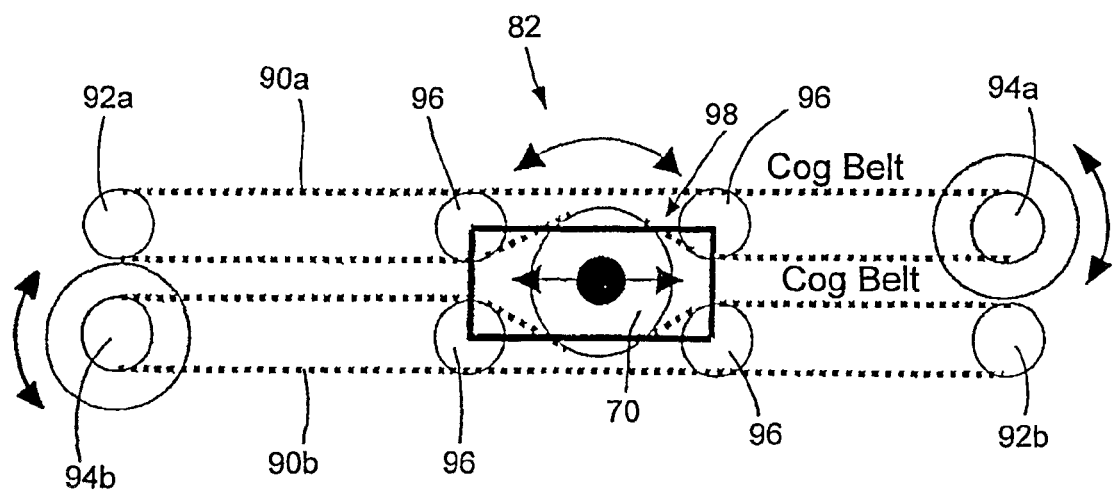
FIG. 7 is a schematic diagram illustrating a top view of the exemplary brake input device of FIGS. 5A-5D with a sensor arrangement for detecting activation of the device.

Turning to FIG. 7, further details of the brake input device 82 are illustrated. The handle 70 is supported for sliding and rotational movement on the guide (not shown in FIG. 7) and is coupled to a pair of cog belts 90a and 90b. Each cog belt 90a and 90b passes around a respective idler pulley 92a and 92b and a respective angular displacement sensor 94a and 94b, thus coupling the handle 70 to the sensors. Idler wheels 96 are fixed for sliding movement along with the handle 70 for helping guide the cog belts 90a and 90b around respective sides of the handle 70. The handle 70 and idler wheels may all be supported by a carriage 98 that is operatively coupled to the guide for sliding movement.

As will be appreciated, linear (sliding) or rotational movement of the handle 70 results in rotation of the angular sensors 94a and 94b. For example, sliding the handle 70 to the left in FIG. 7 results in rotation of both angular sensors 94a and 94b which rotation can be converted to brake signals and fed to the actuators as described previously. Meanwhile, rotation of the handle 70 either clockwise or counterclockwise also results in rotation of the angular sensors 94a and 94b such that left and right side brake signals can be generated. Although the linear position of the handle 70 could be determined solely by analyzing the signals produced by the angular sensors 94a and 94b, a linear sensor could also be provided to measure such movement directly. By comparing the signals from each angular sensor 94a and 94b to each other (and/or a linear sensor if so equipped), differential emergency brake signals can be generated. As will be appreciated, redundant sensors could be provided in place of or in addition to the various idler wheels and/or pulleys.

Turning now to FIGS. 8A-8C and 9, another embodiment of a brake input device is illustrated and generally referred to by reference numeral 100. In this embodiment, the brake input device 100 includes a pair of pedals 104a and 104b. The pedals 104a and 104b may be made to look like aircraft rudder pedals or the like. The pedals may be activated by a pilot's feet as conventional pedals, or may be manual controls intended to be activated by a pilot's hands. In this regard, the pedals can be ergonomically shaped for grasping by a pilot's hand or hands, and can be configured to be pushed or pulled to initiate and/or increase braking.

Each pedal 104a and 104b is operatively coupled to sensors 108 (FIG. 9) that sense movement of each pedal 104a and 104b (e.g., depression). For example, each pedal could be coupled to an angular sensor for measuring rotation about respective pivot points P of each pedal as a pedal is depressed. Alternatively, a linear displacement sensor could be operatively coupled to each pedal so as to measure depression as a function of the movement of the free end of the pedal, for example. The sensors 108 convert movement of the pedal into respective brake signals that are then fed to the actuators as previously described to implement emergency braking/steering.

Figure 8A:
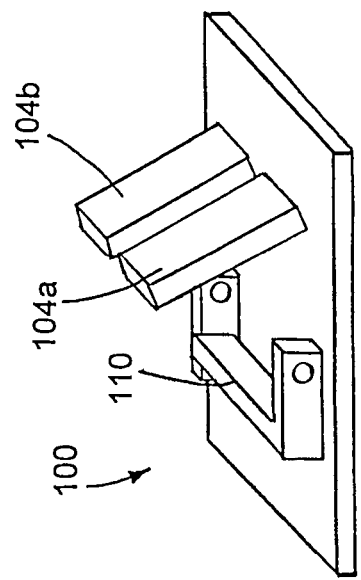
FIGS. 8A-8C are schematic diagrams illustrating another exemplary brake input device in accordance with the invention in various modes of operation.
Figure 8B:
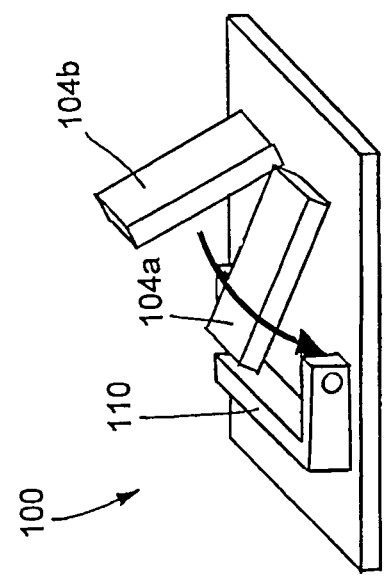

In the position of FIG. 8A, the brake input device 100 is deactivated, and no signal is being sent to the actuators (e.g. neither pedal 104a or 104b is depressed). In FIG. 8B, the left pedal 104a is partially depressed while the right pedal 104b remains in the position of FIG. 8A. This corresponds to a differential braking mode wherein the left hand brakes of the aircraft are activated to a greater extent than the right hand brakes resulting in the aircraft rotating towards the left during braking. Of course, the right side pedal could be depressed slightly or even more so than the left pedal, the latter instance resulting in rotation of the aircraft to the right.

Figure 8C:
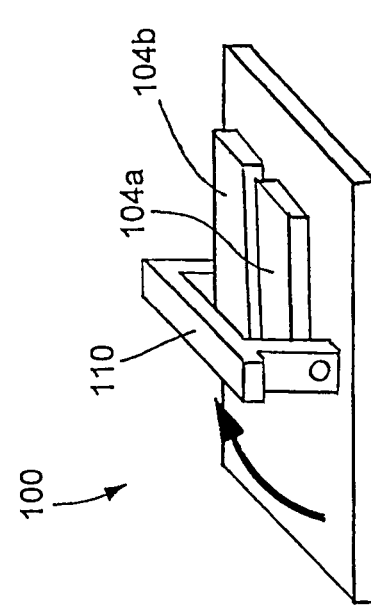
Figure 9:
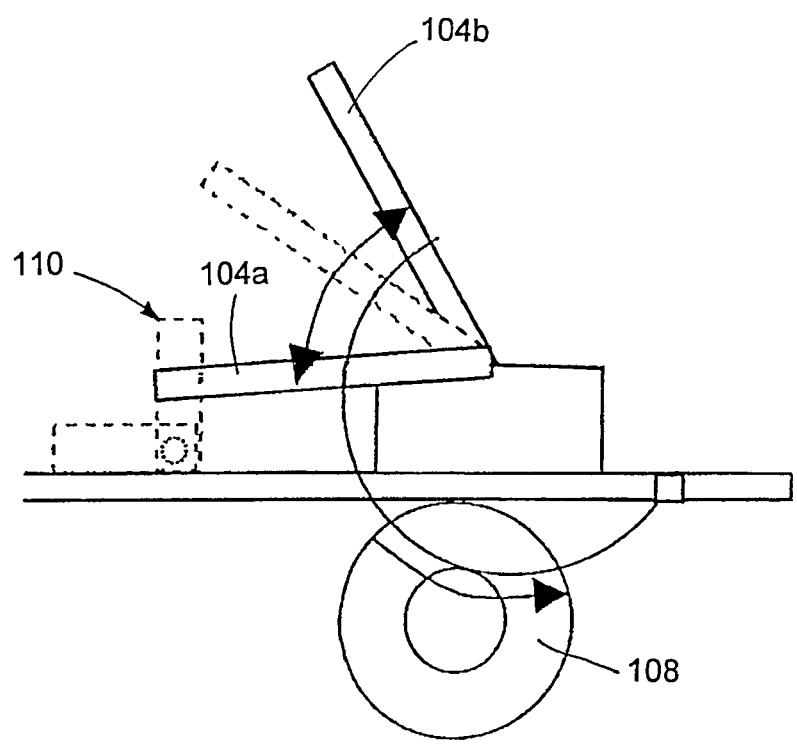
FIG. 9 is another schematic drawing of the brake input device of FIGS. 8A-8C.

In FIG. 8C, both pedals 104a and 104b are fully depressed, and a parking brake latch 110 is positioned above the pedals 104 a and 104b to maintain both pedals in the parking brake position. As will be appreciated, a switch associated with the parking brake latch 110 (see FIG. 2) can indicate to the BCSU when the parking brake latch 110 is in the parking brake applied position.

Figure 10:
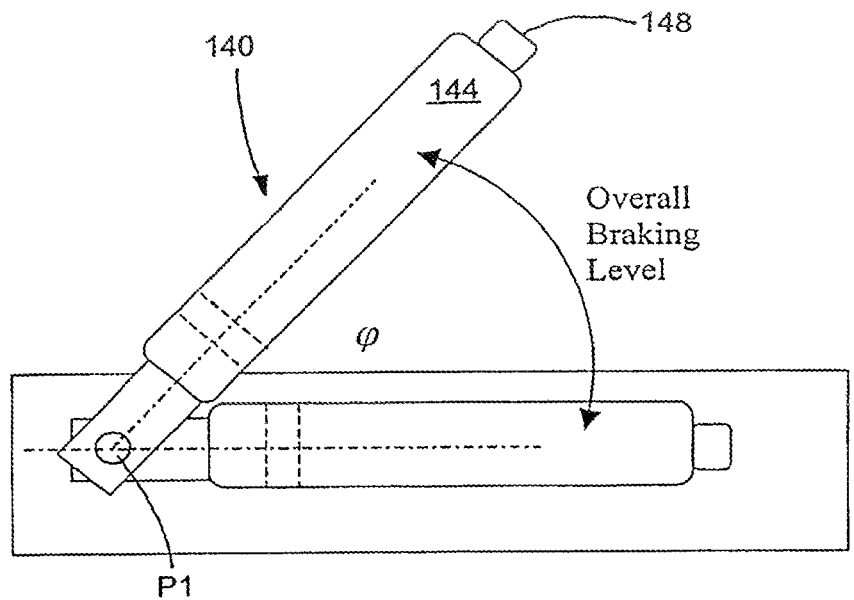
FIG. 10 is a schematic side view of another exemplary brake input device.
Figure 11:
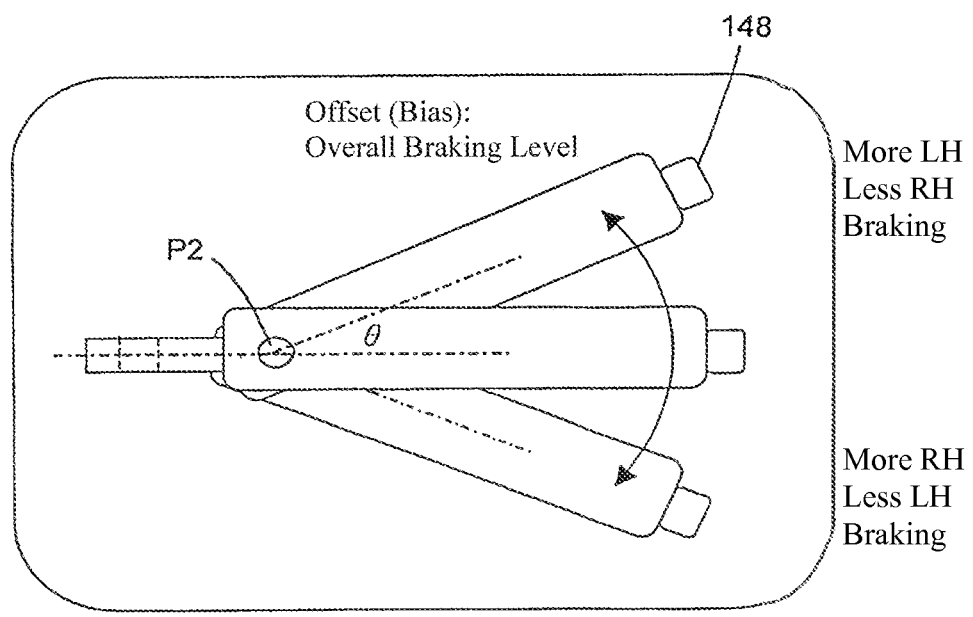
FIG. 11 is a schematic top view of the brake input device of FIG. 10.

Turning now to FIGS. 10 and 11, another exemplary embodiment is illustrated. In this embodiment, a handle 140 having a grip 144 to be grasped by a pilot's hand is provided. The handle 140 is supported for pivoting movement in a vertical plane at pivot P1, The handle 140 can pivot between a horizontal position and more vertical position, for example, as shown. Movement of the handle 140 between such positions can be detected by a suitable sensor (not shown), such as a rotary motion sensor, and can be used to generate a braking magnitude signal in a manner similar to that set forth above in connection with the other embodiments. As will be appreciated, the greater the angle .phi. the greater the magnitude of overall braking. A lock/release button 148 can be provided for locking the handle in a brake applied position (e.g., parking brake).

Turning to FIG. 11, it will be appreciated that the handle 140 also is configured to pivot in a second plane (e.g., the horizontal plane in FIG. 11). To this end, a second pivot point P2 permits pivoting of the handle 140 to the left and right as shown to generate a signal corresponding to the distribution of the overall braking level between left and right brake assemblies. Moving the handle 140 left corresponds with more left hand braking and less righthand braking resulting in the aircraft steering towards the left. Moving the handle 140 to the right corresponds with more righthand braking and less left hand braking resulting in the aircraft steering towards the right. As will be appreciated, the greater the angle θ the greater the braking bias to a given side.

During operation, a pilot will pull upward on the handle 140 pivoting the handle 140 through an angle φ in order to apply the brakes. To apply differential braking, the pilot can then pivot the handle left or right while maintaining the handle at an angle ϕ.

Figure 17:
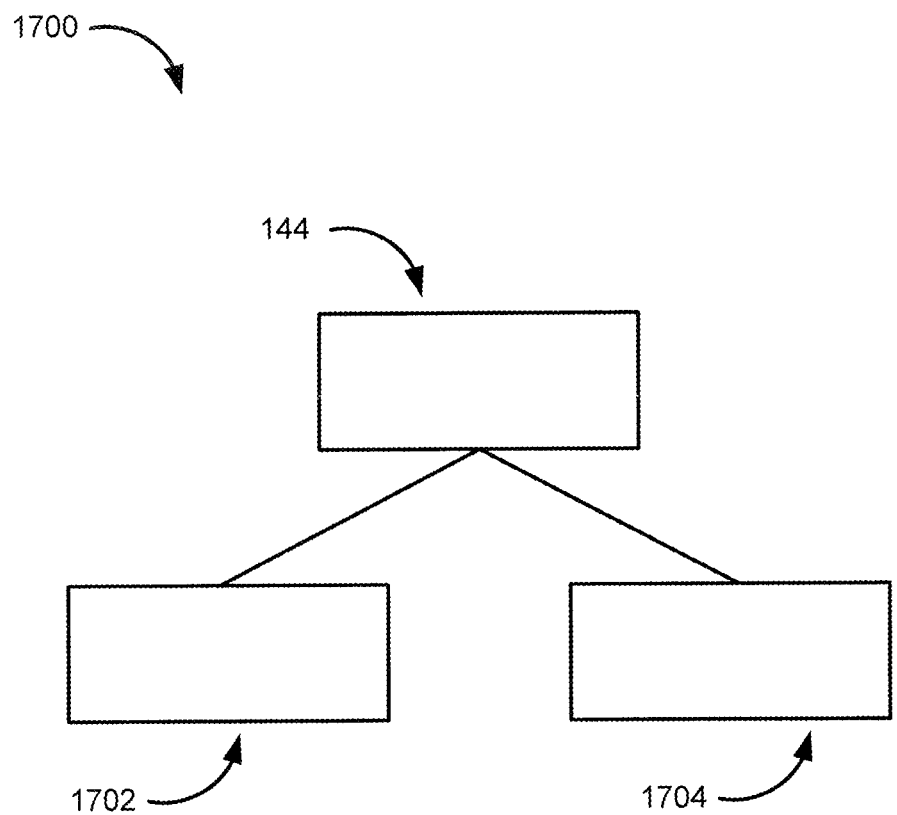
FIG. 17 is a functional diagram of the brake input device of FIG. 10.

With reference to FIG. 17, functional diagram 1700 is shown depicting the embodiment shown in FIGS. 10 and 11. Handle 144 is shown with rotary sensors 1702 and 1704.

Figure 12:
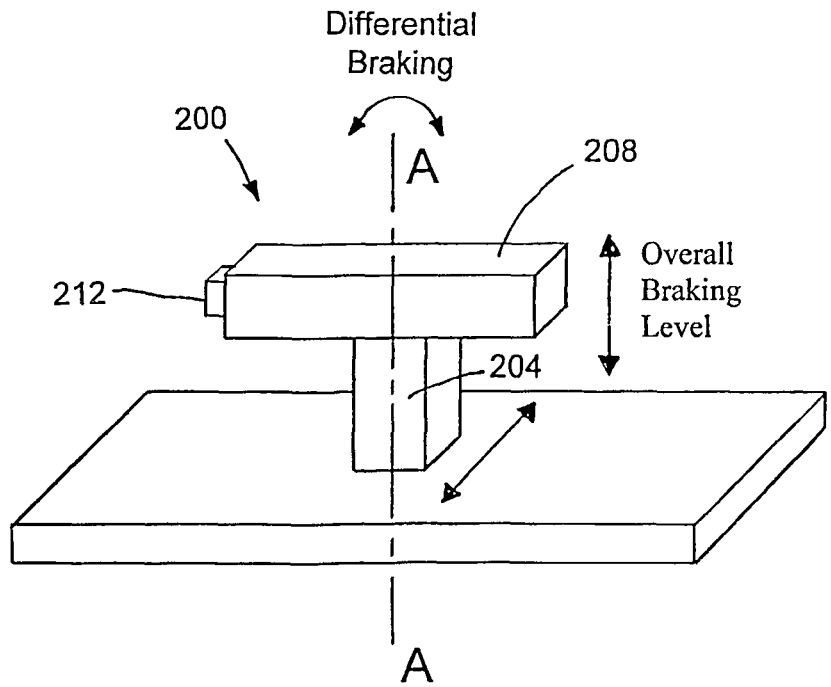
FIG. 12 is a perspective view of another exemplary brake input device in accordance with the invention.

In FIG. 12, another exemplary embodiment of the brake input device is illustrated. In this embodiment, the brake input device is a T-handle 200 that is slideable fore and aft to control overall braking level, and rotatable about a central axis A to control differential braking. The T-handle 200 includes a leg 204 that can be connected to suitable sensors via a carriage such as previously described or via other means. A handle portion 208 is supported by the leg 204 for manipulation by a pilot. A lock button 212 is provided on a side of the handle portion 204 for locking the handle 200 in a parking brake position.

Figure 13:
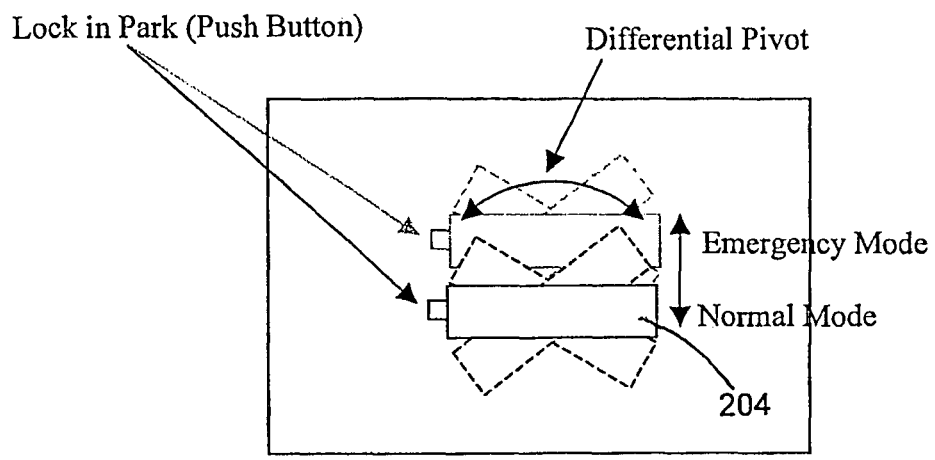
FIG. 13 is a schematic top view of the brake input device of FIG. 12.

With reference to FIG. 13, the T-handle 200 is illustrated in a variety of positions corresponding to varying levels of overall braking and/or differential braking. The T-handle 200 is slideable forward to the emergency mode as shown. The T-handle 200 also is rotatable clockwise and counterclockwise (as shown about axis A in FIG. 12) to control differential braking. For example, rotating the handle 204 clockwise can correspond to more right hand braking and less left hand braking thus causing an aircraft to tend to steer towards the right. Conversely, rotation of the handle 204 counterclockwise can correspond to more left hand braking and less right hand braking thus causing an aircraft to tend to steer leftward. As will be appreciated, the lock button 212 can be depressed to lock the handle in a park position corresponding to full overall braking level in the emergency mode, for example.

Figure 14:
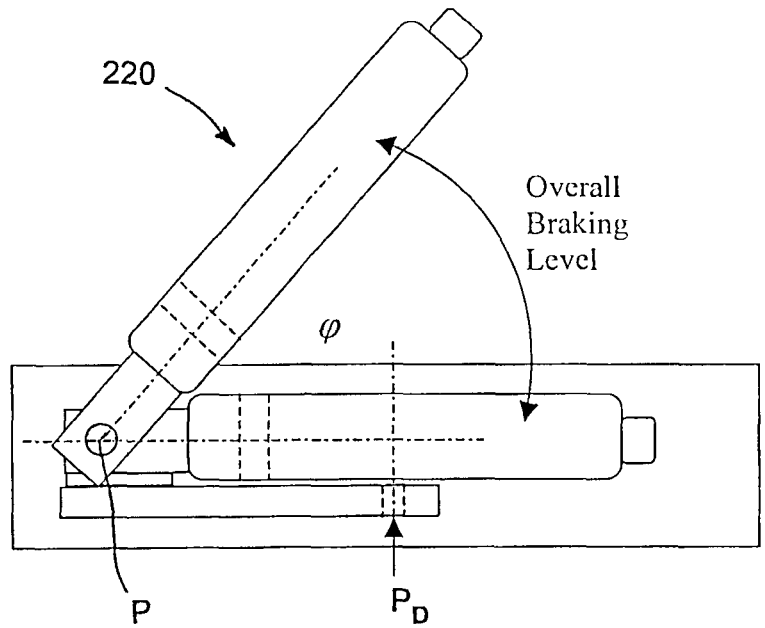
FIG. 14 is a schematic side view another exemplary brake input device.
Figure 15:
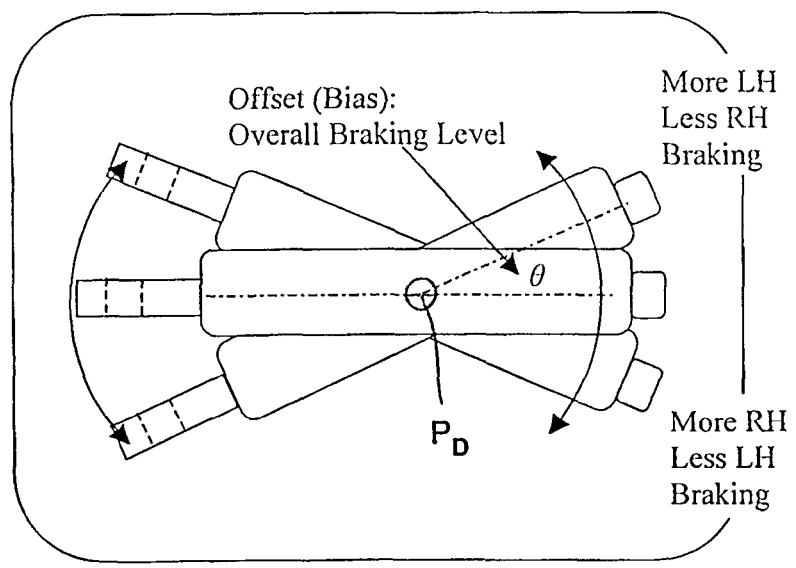
FIG. 15 is a schematic plan view of the exemplary brake input device of FIG. 14 in various positions.
Figure 16:
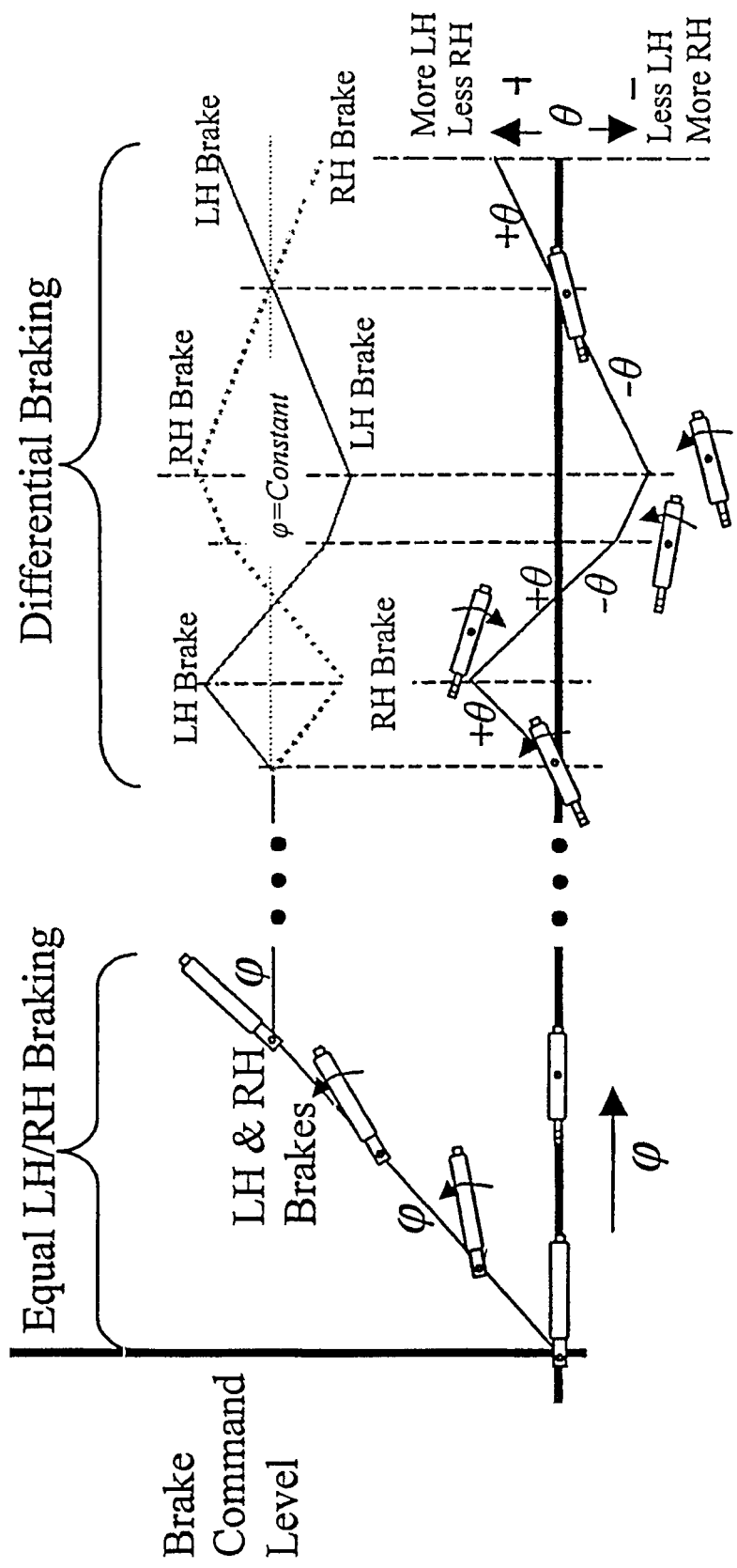
FIG. 16 is a graph illustrating the brake command level generated by the brake input device of FIGS. 14-15 in various positions.

Turning to FIGS. 14-16, yet another exemplary brake input device is illustrated. In this embodiment, the brake input device is in the form of a cantilevered handle 220 that is pivotable in a vertical plane about a pivot point P for indicating overall braking level, and also is rotatable about differential pivot point $P_D$ for indicating differential braking offset as shown in FIG. 15. For example, in FIG. 14 the greater the angle ϕ the greater the overall braking level. In FIG. 15, the greater the angle θ, either positive or negative as the case may be, the greater the braking bias to a given side. For example, if the handle 220 is rotated clockwise (e.g., negative θ) more braking may be applied to the right hand brakes and less to the left hand brakes while if the handle 220 is rotated counterclockwise (e.g., positive θ) more braking may be applied to the left hand brakes and less to the right hand brakes.

To illustrate this concept, FIG. 16 shows the overall braking level and differential braking offset generated by the handle 220 in various positions. As will be appreciated, the concept illustrated in FIG. 16 generally is applicable to other embodiments described above. The four positions of the handle 220 on the left hand side of the graph under "Equal LH/RH Braking" relate to varying degrees of overall braking. The positions range from about zero degrees psi to about 45 degrees psi correspond to zero overall braking and maximum overall braking, respectively. The intermediate positions illustrate overall braking amounts between zero and the maximum. Thus, the handle is shown at varying degrees of the angle ϕ, with a greater angle corresponding to a greater level of overall braking as described above.

On the right side of the graph under "Differential Braking" the handle 220 is shown in five different positions H1-H5, each position corresponding to a different angle θ. The line $L_θ$ represents the angle θ at the various positions. Positive values of angle θ corresponds to more left hand braking and less right hand braking, while negative values of angle θ corresponds to more right hand braking and less left hand braking. Meanwhile, lines $L_{LH}$ and $L_{RH}$ represent the respective left hand and right hand braking values at a give angle θ.

Beginning with position H1, the handle is rotated counterclockwise towards the left thereby increasing the angle θ to a positive value. Accordingly, $L_{LH}$ indicates an increased amount of left hand braking while $L_{RH}$ indicates a decreased amount of right hand braking.

At position H2, the handle 220 is rotated counterclockwise back towards the right causing angle θ to decrease in value towards zero and eventually go negative. Thus, $L_{LH}$ trends back towards zero while $L_{RH}$ increases. At position H3, $L_{RH}$ is positive while $L_{LH}$ is negative thereby indicating more right hand braking and less left hand braking.

At position H3, the handle 220 is rotated counterclockwise back towards the left but remains at a negative angle θ until position H4. Thus, $L_{RH}$ increases at lesser rate while $L_{LH}$ decreases at a lesser rate. At position H4, the handle 220 is rotated counterclockwise to a positive angle θ and thus $L_{RH}$ returns to zero and then goes negative, while $L_{LH}$ goes positive.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:
1. An emergency brake input device for providing emergency braking signals to at least two brake assemblies, the device comprising
an input member movable in a first direction corresponding to a braking magnitude and movable in a second direction corresponding to a relative distribution of the braking magnitude between first and second brake signals for the control of the at least two brake assemblies,
whereby the first and second brake signals can be modulated during emergency braking so as to apply differential braking to separate wheels of an aircraft
wherein the input member is pivotable about a first point located on the input member in a first plane to indicate braking magnitude and pivotable about a second point located on the input member in a second plane to indicate relative distribution of the braking magnitude,
wherein the second point is displaced from the first point along a length of the input member,
wherein a first rotary motion sensor and a second rotary motion sensor generate a brake signal, wherein the input member comprises a handle and a lock/release button,
wherein the first point is located at a first end of the handle and the lock/release button is located at a second end of the handle,
wherein the lock/release button is operable to lock the handle in a brake applied position and to release the handle from the brake applied position.

2. An emergency brake input device as set forth in claim 1, wherein the brake signal is an electric signal.

3. The emergency brake input device as set forth in claim 1, wherein the brake applied position corresponds to a maximum magnitude of braking.

4. The emergency brake input device as set forth in claim 1, wherein the lock/release button is a a parking brake lock for locking the input member in a parking brake position.

5. The emergency brake input device as set forth in claim 4, further comprising a parking brake sensor for sensing when the input device is in a parking brake mode and for generating a signal in response thereto.

6. An aircraft braking system comprising at least one brake assembly for braking a wheel of an aircraft, the braking assembly including at least one actuator for effecting a braking action in response to a braking signal provided thereto, and the brake input device as set forth in claim 1 for providing the braking signal to the brake actuator.

* * * * *